No. 877,333. PATENTED JAN. 21, 1908.
J. H. HAYNES.
COMPOUND IMPLEMENT.
APPLICATION FILED APR. 26, 1907.

Witnesses
Gertrude Manning
A. B. Decker

Inventor
James H. Haynes
By Delbert H. Decker
Attorney

UNITED STATES PATENT OFFICE.

JAMES H. HAYNES, OF DE LEON, TEXAS.

COMPOUND IMPLEMENT.

No. 877,333.         Specification of Letters Patent.         Patented Jan. 21, 1908.

Application filed April 26, 1907. Serial No. 370,435.

*To all whom it may concern:*

Be it known that I, JAMES H. HAYNES, a citizen of the United States, residing at De Leon, in the county of Comanche and State of Texas, have invented a new and useful Improvement in Compound Implements, of which the following is a specification.

This invention relates to compound implements and particularly to such an implement designed for use in building and repairing wire fences.

The object of the invention is to combine with a post-hole digger, of the ordinary type having a pair of blades or scoops hinged together, certain additional parts by which a portion of the implement so compounded, may be readily employed for stretching fence wire, splicing or taking up slack therein.

With these objects in view the invention consists in the implement substantially as hereinafter described and claimed.

Figure 1:
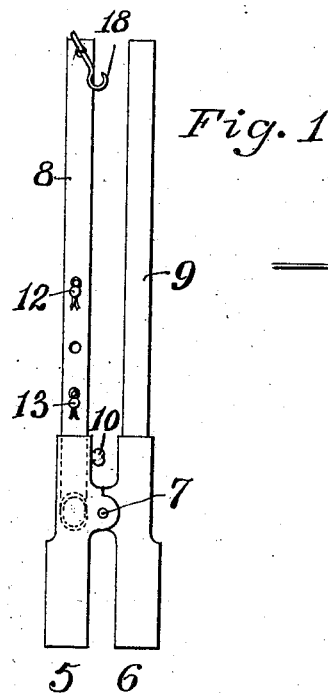
Figure 2:
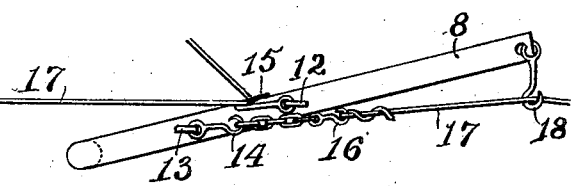
Figure 3:
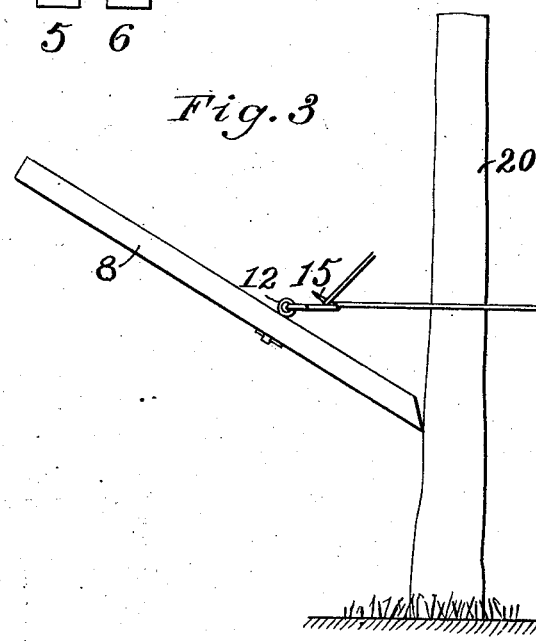
Figure 4:
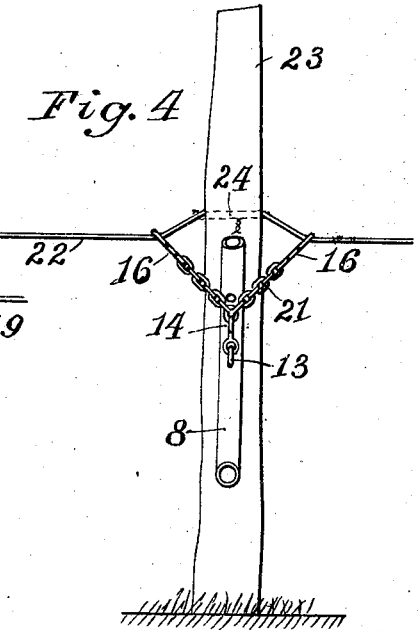

In the accompanying drawings, which form a part of this specification, Figure 1 represents the improved implement for use as a post-hole digger; Fig. 2 represents a portion of this implement for use in splicing fence wire; Fig. 3 represents a portion of said implement for use in stretching fence wire and Fig. 4 represents a portion of said implement for use in taking up slack in fence wire.

5 and 6 represent respectively the scoops or blades of the post-hole digger, which are hinged together at 7 and are provided with handles 8 and 9. The handle 8 is, for the present purposes, made removable from the socket of blade 5, in which it may be held by any suitable means such, for instance, as a thumb screw 10. This handle is preferably constructed from a piece of pipe or tubing and preferably also cut obliquely at the lower end as indicated. Through this handle may be bored a number of holes in which may be removably inserted eye-pins, as indicated at 12 and 13. These eye-pins may carry hooks of any suitable form, either chain hooks 14 or grab hooks, such as shown at 15. The handle is also preferably provided with a hook such as shown at 18, which may be used in hanging up the implement or in the splicing of wire, as indicated in Fig. 2.

In splicing a wire the handle 8 may carry two grab hooks or a grab hook and chain hook, as seen in Fig. 2, in which case, a chain may be placed on hook 14 and to its own hook 16, which may be a chain or grab hook, one end of the fence wire 17 may be connected, while the other end of the fence wire 17 may be secured to the hook 15. These connections would be made when the upper end of the handle 8 was over at the left. Then by swinging said end over to the right the two ends of the wire will be brought together for splicing. To hold the handle or lever in position during splicing, the hook 18 may be placed over the wire 17, as shown in Fig. 2.

In stretching wire but one hook is necessary, as shown in Fig. 3 and this hook may be a grab hook, as shown, or it may be a chain hook with a wire looped in it, as seen at 16 in Fig. 2. Or if desired, and necessary because of the wire 19 not being long enough to reach the post indicated at 20, a chain may be inserted in the hook on the lever and the wire connected to the end of the chain. The pointed end of the lever 18 will hold said lever to the post in the operation of stretching.

In taking up the slack, particularly in wire that has hung for some time, the lever 8 may be used as indicated in Fig. 4, wherein a chain hook 14 is preferably used and to this a piece of chain, as 21, may be connected as by its middle link, while hooks, preferably chain hooks 16, on the ends of the piece of chain are placed over the slack wire 22. Then by pressing the lever downward with its sharpened end resting against the post 23, the wire may be brought against the sides of the post and tacked there or a short length of wire, as indicated in dotted lines at 24, may be passed over the wire 22 on the side of the post opposite to its original stapling and, thereby hold the slack taken up by the implement. A piece of cable or wire rope with hooks at its ends may obviously be used in the place of the chain 21.

The handle 8 may consist of an ordinary crow bar provided with the necessary holes for the eye-pins 12 and 13 and the hook 18.

The invention claimed is:—

In a wire stretcher, a lever provided with transverse holes near the lower end thereof, and having eye-bolts carrying wire stretching hooks removably inserted in said holes and a hook connected to the upper end of said lever and serving as a catch or holding hook and also as a hanging hook, said lever being tubular and cut obliquely at its lower end and adapted to be used as a handle for a post-hole digger, with one of the scoops of which it may be removably connected, substantially as set forth.

In testimony whereof I have signed my name to this specification in the presence of two subscribing witnesses.

JAMES H. HAYNES.

Witnesses:
  A. E. HAMPTON,
  GORDON BAGWELL.